(12) United States Patent  
Michaelis

(10) Patent No.: US 7,567,653 B1  
(45) Date of Patent: Jul. 28, 2009

(54) METHOD BY WHICH CALL CENTERS CAN VECTOR INBOUND TTY CALLS AUTOMATICALLY TO TTY-ENABLED RESOURCES

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 688 days.

(21) Appl. No.: 11/087,290

(22) Filed: Mar. 22, 2005

(51) Int. Cl.
*H04M 11/00* (2006.01)
(52) U.S. Cl. .......................... 379/52; 370/352; 370/270
(58) Field of Classification Search .................. 379/52, 379/265.09, 219; 455/3.06; 370/352, 270
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |

(Continued)

FOREIGN PATENT DOCUMENTS

CA  2143198  1/1995

(Continued)

OTHER PUBLICATIONS

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

(Continued)

*Primary Examiner*—Curtis Kuntz  
*Assistant Examiner*—Maria El-Zoobi  
(74) *Attorney, Agent, or Firm*—Sheridan Ross P.C.

(57) ABSTRACT

The present invention is directed to a contact processing system that includes:
  (a) a gateway operable to receive an incoming contact and transmit at least one TTY character to the contactor; and
  (b) a TTY contact identifier operable to (i) determine whether a TTY response is received within a selected time from the contactor, wherein steps (b) and (c) are performed before the contact is routed to a contact center resource; (ii) when a TTY response is received within the selected time, rout the contact to a TTY-enabled contact center resource; and (iii) when no TTY response is received within the selected time, process the contact as a non-TTY-enabled contact.

20 Claims, 4 Drawing Sheets

U.S. PATENT DOCUMENTS

| | | | |
|---|---|---|---|
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,744 A | 8/1995 | Yamamoto et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,555,299 A | 9/1996 | Maloney et al. | |
| 5,577,169 A | 11/1996 | Prezioso | |
| 5,592,378 A | 1/1997 | Cameron et al. | |
| 5,592,542 A | 1/1997 | Honda et al. | |
| 5,594,726 A | 1/1997 | Thompson et al. | |
| 5,603,029 A | 2/1997 | Aman et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | |
| 5,684,874 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,742,763 A | 4/1998 | Jones | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,802,510 A | 9/1998 | Jones | |
| 5,818,907 A | 10/1998 | Maloney et al. | |
| 5,819,084 A | 10/1998 | Shapiro et al. | |
| 5,825,869 A | 10/1998 | Brooks et al. | |
| 5,826,039 A | 10/1998 | Jones | |
| 5,828,747 A | 10/1998 | Fisher et al. | |
| 5,838,968 A | 11/1998 | Culbert | |
| 5,839,117 A | 11/1998 | Cameron et al. | |
| 5,864,874 A | 1/1999 | Shapiro | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,911,134 A | 6/1999 | Castonguay et al. | |
| 5,914,951 A | 6/1999 | Bentley et al. | |
| 5,915,012 A | 6/1999 | Miloslavsky | |
| 5,923,745 A | 7/1999 | Hurd | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,014,437 A * | 1/2000 | Acker et al. | 379/219 |
| 6,031,896 A | 2/2000 | Gardell et al. | |
| 6,038,293 A | 3/2000 | Mcnerney et al. | |
| 6,038,296 A | 3/2000 | Brunson et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,049,779 A | 4/2000 | Berkson | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,084,954 A | 7/2000 | Harless et al. | |
| 6,088,411 A | 7/2000 | Powierski et al. | |
| 6,088,441 A | 7/2000 | Flockhart et al. | |
| 6,108,670 A | 8/2000 | Weida et al. | |
| 6,115,462 A | 9/2000 | Servi et al. | |
| 6,128,304 A | 10/2000 | Gardell et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,185,603 B1 | 2/2001 | Henderson et al. | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick et al. | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley et al. | |
| 6,292,550 B1 | 9/2001 | Burritt | |
| 6,295,353 B1 | 9/2001 | Flockhart et al. | |
| 6,298,062 B1 | 10/2001 | Gardell et al. | |
| 6,307,931 B1 | 10/2001 | Vaudreuil | |
| 6,324,282 B1 | 11/2001 | McIllwaine et al. | |
| 6,332,081 B1 | 12/2001 | Do | |
| 6,339,754 B1 | 1/2002 | Flanagan et al. | |
| 6,353,810 B1 | 3/2002 | Pertrushin | |
| 6,356,632 B1 | 3/2002 | Foster et al. | |
| 6,360,222 B1 | 3/2002 | Quinn | |

| Patent | Date | Inventor |
|---|---|---|
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,459,787 B2 | 10/2002 | McIllwaine et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,561,805 B2 | 5/2003 | Kumar |
| 6,563,920 B1 | 5/2003 | Flockhart et al. |
| 6,574,599 B1 | 6/2003 | Lim et al. |
| 6,597,685 B2 | 7/2003 | Miloslavsky et al. |
| 6,603,854 B1 | 8/2003 | Judkins et al. |
| 6,614,903 B1 | 9/2003 | Flockhart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,775,377 B2 | 8/2004 | McIllwaine et al. |
| 6,785,666 B1 | 8/2004 | Nareddy et al. |
| 6,822,945 B2 * | 11/2004 | Petrovykh .................. 370/270 |
| 6,829,348 B1 * | 12/2004 | Schroeder et al. ...... 379/265.09 |
| 6,839,735 B2 | 1/2005 | Wong et al. |
| 6,842,503 B1 * | 1/2005 | Wildfeuer .................... 379/52 |
| 6,915,305 B2 | 7/2005 | Subramanian et al. |
| 6,947,543 B2 | 9/2005 | Alvarado et al. |
| 6,968,052 B2 | 11/2005 | Wullert, II |
| 6,981,061 B1 | 12/2005 | Sakakura |
| 6,988,126 B2 | 1/2006 | Wilcock et al. |
| 7,020,254 B2 | 3/2006 | Phillips |
| 7,035,808 B1 | 4/2006 | Ford |
| 7,035,927 B2 | 4/2006 | Flockhart et al. |
| 7,076,051 B2 | 7/2006 | Brown et al. |
| 7,100,200 B2 | 8/2006 | Pope et al. |
| 7,110,525 B1 | 9/2006 | Heller et al. |
| 7,117,193 B1 | 10/2006 | Basko et al. |
| 7,155,612 B2 | 12/2006 | Licis |
| 7,158,628 B2 | 1/2007 | McConnell et al. |
| 7,158,909 B2 | 1/2007 | Tarpo et al. |
| 7,170,976 B1 * | 1/2007 | Keagy ........................ 379/52 |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,392,402 B2 | 6/2008 | Suzuki |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0012186 A1 | 8/2002 | Ford et al. |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2003/0014491 A1 | 1/2003 | Horvitz et al. |
| 2003/0028621 A1 | 2/2003 | Furlong et al. |
| 2003/0073440 A1 | 4/2003 | Mukherjee et al. |
| 2003/0093465 A1 | 5/2003 | Flockhart et al. |
| 2003/0144900 A1 | 7/2003 | Whitmer |
| 2003/0144959 A1 | 7/2003 | Makita |
| 2003/0174830 A1 | 9/2003 | Boyer et al. |
| 2003/0177017 A1 | 9/2003 | Boyer et al. |
| 2003/0231757 A1 | 12/2003 | Harkreader et al. |
| 2004/0008828 A1 | 1/2004 | Coles et al. |
| 2004/0057569 A1 | 3/2004 | Busey et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0165717 A1 | 8/2004 | McIlwaine et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0228325 A1 * | 11/2004 | Hepworth et al. ........... 370/352 |
| 2005/0021529 A1 | 1/2005 | Hodson et al. |
| 2005/0027612 A1 | 2/2005 | Walker et al. |
| 2005/0044375 A1 | 2/2005 | Paatero et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0125458 A1 | 6/2005 | Sutherland et al. |
| 2005/0154708 A1 | 7/2005 | Sun |
| 2006/0007916 A1 * | 1/2006 | Jones et al. .................. 370/352 |
| 2006/0015388 A1 | 1/2006 | Flockhart et al. |
| 2006/0056598 A1 * | 3/2006 | Brandt et al. ................. 379/52 |
| 2006/0135058 A1 * | 6/2006 | Karabinis ................. 455/3.06 |
| 2006/0171510 A1 * | 8/2006 | Mundra et al. ............... 379/52 |
| 2006/0178994 A1 | 8/2006 | Stolfo et al. |
| 2006/0271418 A1 | 11/2006 | Hackbarth et al. |
| 2007/0064912 A1 | 3/2007 | Kagan |
| 2007/0083572 A1 | 4/2007 | Bland et al. |
| 2007/0127643 A1 * | 6/2007 | Keagy ..................... 379/88.13 |
| 2007/0201311 A1 | 8/2007 | Olson |
| 2007/0230681 A1 | 10/2007 | Boyer et al. |
| 2008/0056165 A1 | 3/2008 | Petrovykh |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 829 996 A2 | 3/1998 |
| EP | 0 855 826 A2 | 7/1998 |
| EP | 0 863 651 A2 | 9/1998 |
| EP | 0 866 407 A1 | 9/1998 |
| EP | 899673 A2 | 3/1999 |
| EP | 998108 A1 | 5/2000 |

| | | |
|---|---|---|
| EP | 1035718 | 9/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO97/28635 | 8/1997 |
| WO | WO 98/56207 | 12/1998 |
| WO | WO 01/80094 | 10/2001 |

OTHER PUBLICATIONS

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
G. Hellstrom et al., "RFC 2793—RTP Payload for Text Consersation," Network Working Group Request for Comments 2793 (May 2000), available at http://www.faqs.org/rfcs/rfc2793.html, 8 pages.
Kimball, et al., "Practical Techniques for Extracting, Cleaning, Conforming, and Delivering Data." The Data Warehouse ETL Toolkit. 2004. Ch. 5, pp. 170-174.
Snape, James, "Time Dimension and Time Zones." 2004. pp. 1-10. http://www.jamessnape.me.uk/blog/CommentView,gui,79e910a1-0150-4452-bda3-e98d.
Data Warehouse Designer—Divide and Conquer, Build Your Data Warehouse One Piece at a Time, Ralph Kimball, Oct. 30, 2002, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
DMReview—Business Dimensional Modeling: The Logical Next Step: Translating the BDM, Laura Reeves, published May 2004, 4 pages.
Multi-Dimensional Modeling with BW ASAP for BW Accelerator Business Information Warehouse, copyright 2000, 71 pages.
ComputerWorld, ETL, M. Songini, at http://www.computerworld.com/databasetopics/businessintelligence/datawarehouse/story/..., copyright 2005, 5 pages.
Kimball, et al., "The Complete Guide to Dimensional Modeling." The Data Warehouse Toolkit. 2nd Edition, 2002. Ch. 11, pp. 240-241.
Fundamentals of Data Warehousing—Unit 3—Dimensional Modeling, Fundamentals of Data Warehousing, copyright 2005—Evolve Computer Solutions, 55 pages.
The Importance of Data Modeling as a Foundation for Business Insight, Larissa Moss and Steve Hoberman, copyright 2004, 38 pages.
CS 345: Topics in Data Warehousing, Oct. 5, 2004, 36 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 page.
Data Warehouse Designer Fact Tables and Dimension, Jan. 1, 2003, http://www.inteeigententerprise.com/030101/602warehouse1_1.jhtml, Ralph Kimball, 3 page.
Glossary—Curlingstone Publishing, http://www.curlingstone.com/7002/7002glossary.html, downloaded May 24, 2005, 11 pages.
Data Warehouse—Surrogate Keys, Keep Control Over Record Identifiers by Generating New Keys for the Data Warehouse, Ralph Kimball, May 1998, 4 pages.
Data Warehouse Designer—An Engineer's View—Its' Worthwhile to Remind Ourselves Why We Build Data Warehouses the Way We Do, Ralph Kimball, Jul. 26, 2002, 3 pages.
Data Warehouse Designer—Design Constraints and Unavoidable Realities, No design Problem in School was This Hard, Ralph Kimball, Sep. 3, 2002, 3 pages.
Data Warehouse Designer—Two Powerful Ideas, The Foundation for Modern Data Warehousing, Ralph Kimball, Sep. 17, 2002, 3 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Multi Channel Product Authorization," (PA) Version 5.0, (Nov. 2003) (6 pages).
Nortel—"Centrex Internet Enabled Call Centers," http://www.products.nortel.com/go/product_assoc.jsp?segId=0&parID=0&catID=9191&rend_id... (Copyright 1999-2005) (1 page).
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
Aspect—"Analysis and Reporting," http://aspect.com/products/analysis/index.cfm, (Copyright 2005) (1 page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1 page).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Cherry, "Anger Management," IEEE Spectrum (Apr. 2005) (1 page).
Nice Systems—"Insight from Interactions," "Overwhelmed by the Amount of Data at your Contact Center?" http://www.nice.com/products/multimedia/analyzer.php, (Printed May 19, 2005) (2 pages).
Nice Systems—"Multimedia Interaction Products," "Insight from Interactions," http://www.nice.com/products/multimedia/contact_centers.php (Printed May 19, 2005) (3 pages).
"KANA—Contact Center Support", available at http://www.kana.com/solutions.php?tid=46, copyright 2006, 3 pages.
Creating and Using Data Warehouse Dimension Tables (Microsoft) copyright 2005, http://msdn.microsoft.com/library/en-us/createdw/createdw_10kz.asp?frame=true, 3 pages.

"Avaya IQ—Building Upon the Strengths of CMS", White Paper, Feb. 2007, 11 pages.

"Dimensional database", Wikipedia, downloaded Aug. 30, 2007 (3 pages).

"Driving Model Agent Behaviors With Avaya IQ", White Paper, Apr. 2007, 12 pages.

A.A. Vaisman et al., "A Temporal Query Language for OLAP: Implementation and a Case Study", LNCS, 2001, vol. 2397, 36 pages.

A.B. Schwarzkopf, "Dimensional Modeling for a Data Warehouse", date unknown, 18 pages.

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Avaya IQ "Introducing Reporting And Analytics As You Designed It", 2007, 4 pages.

Bill Michael, "The Politics of Naming" www.cConvergence.com (Jul. 2001) pp. 31-35.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

D. Browning et al., "Data Warehouse Design Considerations", Microsoft SQL 2000 Technical Articles, Dec. 2001, 24 pages.

D. Smith, "Data Model Overview Modeling for the Enterprise While Serving the Individual", Teredata Global Sales Support, 2007, 33 pages.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

E. Veerman, "Designing A Dimensional Model", date unknown, 38 pages.

G. Wiederhold, "Mediation to Deal with Heterogeneous Data Sources", Stanford University, Jan. 1999, 19 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

J. Cahoon, "Fast Development of a Data Warehouse Using MOF, CWM and Code Generation", CubeModel, May 22, 2006, 32 pages.

J.E. Bentley, "Metadata: Everyone Talks About It, But What Is It?", First Union National Bank, date unknown, 5 pages.

L. Cabibbo et al., "An Architecture For Data Warehousing Supporting Data Independence And Interoperability", International Journal of Cooperative Information Systems, Nov. 2004, 41 pages.

O. Boussaid et al., "Integration and dimensional modeling approaches for complex data warehousing", J. Global Optimization, vol. 37, No. 4, Apr. 2007, 2 pages.

Richard Shockey, "ENUM: Phone Numbers Meet the Net" www.cConvergence.com (Jul. 2001) pp. 21-30.

Rose et al..; "The APEX Presence Service," Network Working Group (Jan. 14, 2002), available at http://www.ietf.org/internet-drafts/draft-ietf-apex-presence-06.txt, 31 pages.

Sugano et al.; "Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

Andy Zmolek; "Simple and Presence: Enterprise Value Propositions," Avaya presentation, 16 pages, presented Jan. 24, 2002.

Berners-Lee et al.; "Uniform Resource Identifiers (URI); Generic Syntax," Network Working Group, Request for Comments 2396 (Aug. 1998), 38 pages.

Dawson et al.; "Vcard MIME Directory Profile," Network Working Group (Sep. 1998), available at http://www.ietf.org/rfc/rfc2426.txt?number=2426, 40 pages.

Fielding et al.; "Hypertext Transfer Protocol—HTTP/1.1," Network Working Group, Request for Comments 2068 (Jan. 1997), 152 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

Holtman et al.; "HTTP Remote Variant Selection Algorithm—RVSA/1.0," Network Working Group (Mar. 1998), available at http://www.ietf.org/rfc/rfc2296.txt?number=2296, 13 pages.

Holtman et al.; "Transparent Content Negotiation in HTTP," Network Working Group (Mar. 1998), available at http://www.ietf.org/rfc/rfc2295.txt?number=2295, 55 pages.

Doo-Hyun Kim et al. "Collaborative Multimedia Middleware Architecture and Advanced Internet Call Center"; ProceedingsInternational Conference on Information Networking (Jan. 31, 2001), pp. 246-250.

Presentation by Victor Zue, The MIT Ox90ygen Project, MIT Laboratory for Computer Science (Apr. 25-26, 2000).

MIT Project Oxygen, Pervasive, Human-Centered Computing (MIT Laboratory for Computer Science) (Jun. 2000).

E. Noth et al., "Research Issues for the Next Generation Spoken"; University of Erlangen-Nuremberg, Bavarian Research Centre for Knowledge-Based Systems, at http:--www5.informatik.uni-erlangen.de-literature-psdir-1999-Noeth99:RIF.ps.gz.

John H.L. Hansen and Levent M. Arslan, Foreign Accent Classification Using Source Generator Based Prosodic Features, IEEE Proc. ICASSP, vol. 1, pp. 836-839, Detroit USA (May 1995).

Levent M. Arslan and John H.L. Hansen, Language Accent Classification in American English, Robust Speech Processing Laboratory, Duke University Department of Electrical Engineering, Durham, NC, Technical Report RSPL-96-7, revised Jan. 29, 1996.

Levent M. Arslan, Foreign Accent Classification in American English, Department of Electrical Computer Engineering, Duke University, Thesis, pp. 1-200 (1996).

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

Definity Communications System Generic 3 Call Vectoring-Expert Agent Selection (EAS) Guide, AT&T publication No. 555-230-520 (Issue 3, Nov. 1993).

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Coles, Scott, "A Guide for Ensuring Service Quality In IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
"Still Leaving It To Fate?: Optimizing Workforce Management", Durr, William Jr., Nov. 2001.
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
Doo-Hyun Kim et al. "Collaborative Multimedia Middleware Architecture and Advanced Internet Call Center"; ProceedingsInternational Conference on Information Networking (Jan. 31, 2001), pp. 246-50.
Presentation by Victor Zue, The MIT Ox90ygen Project, MIT Laboratory for Computer Science (Apr. 25-26, 2000).
MIT Project Oxygen, Pervasive, Human-Centered Computing (MIT Laboratory for Computer Science) (Jun. 2000).
E. Noth et al., "Research Issues for the Next Generation Spoken"; University of Erlangen-Nuremberg, Bavarian Research Centre for Knowledge-Based Systems, at http:--ww5.informatik.uni-erlangen.de-literature-psdir-1999-Noeth99:RIF.ps.gz.
L.F. Lamel and J.L. Gauvain, Language Identification Using Phone-Based Acoustic Likelihoods, ICASSP-94, 4 pages.
John H.L. Hansen and Levent M. Arslan, Foreign Accent Classification Using Source Generator Based Prosodic Features, IEEE Proc. ICASSP, vol. 1, pp. 836-839, Detroit USA (May 1995).
Levent M. Arslan and John H.L. Hansen, Language Accent Classification in American English, Robust Speech Processing Laboratory, Duke University Department of Electrical Engineering, Durham, NC, Technical Report RSPL-96-7, revised Jan. 29, 1996.
Levent M. Arslan, Foreign Accent Classification in American English, Department of Electrical Computer Engineering, Duke University, Thesis, pp. 1-200 (1996).
No Author, "When Talk Isn't Cheap" Sm@rt Reseller, v. 3, n. 13 (Apr. 3, 2000), p. 50.
No Author, "eGain's Commerce 2000 Platform Sets New Standard for eCommerce Customer Communications" Business Wire (Nov. 15, 1999).
Definity Communications System Generic 3 Call Vectoring-Expert Agent Selection (EAS) Guide, AT&T publication No. 555-230-520 (Issue 3, Nov. 1993).
Microsoft Office Animated Help Tool.
"Product Features," Guide to Call Center Automation, Brock Control Systems, Inc., Activity Managers Series™, Section 5 - Company B120, p. 59, 1992.
"Product Features,"Guide to Call Center Automation, CRC Information Systems, Inc., Tel-Athena, Section 5 - Company C520, p. 95,1 992.
Dawson, "NPRI's Powerguide, Software Overview", Call Center Magazine (Jun. 1993), p. 85.

"Applications, NPRI's Predictive Dialing Package," Computer Technology (Fall 1993), p. 86.
"Call Center Software You Can't Outgrow," Telemarketing® (Jul. 1993), p. 105.
"VAST™, Voicelink Application Software for Teleservicing®," System Manager User's Guidem Digital Systems (1994), pp. ii, vii-ix, 1-2, 2-41 through 2-77.
Geotel Communications Corporation Web site printout entitled "Intelligent CallRouter", Optimizing the Interaction Between Customers and Answering Resources. 6 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2003, Avaya, Inc. 2003.
Stevenson et al.; "Name Resolution in Network and Systems Management Environments"; http://netman.cti.buffalo.edu/Doc/DStevenson/NR-NMSE.html; 16 pages.
"Still Leaving It To Fate?; Optimizing Workforce Management", Durr William Jr., Nov. 2001.
U.S. Appl. No. 10/683,039, filed Oct. 10, 2003, Flockhart et al.
U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Flockhart et al.
U.S. Appl. No. 10/946,638, filed Sep. 20, 2004, Flockhart et al.
O. Boussaid et al., "Integration and dimensional modeling approaches for complex data warehousing", J. Global Optimization, vol. 37, No. 4, Apr. 2007, 2 pages.
Richard Shockey, "ENUM: Phone Numbers Meet the Net" www.cConvergence.com (Jul. 2001) pp. 21-30.
Rose et al.; "The APEX Presence Service," Network Working Group (Jan. 14, 2002), available at http://www.ietf.org/internet-drafts/draft-ietf-apex-presence-06.txt, 31 pages.
Sugano et al. ;"Common Presence and Instant Messaging (CPIM) Presence Information Data Format," Network Working Group (Dec. 2002), available at http://www.ietf.org.internet-drafts/draft-ietf-impp-cpim-pidf-07.txt, 26 pages.
Intelligent Enterprise Magazine - Data Warehouse Designer: Fact Tables and Dimension, downloaded May 18, 2005, http://www.intelligententerprise.com/030101/602warehouse1__1.jhtml, 7 pages.
Andy Zmolek; "Simple and Presence: Enterprise Values Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol - HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm - RVSA/ 1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Background of the Invention for the above-captioned application (previously provided).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
US 6,537,685, 03/2003, Fisher et al. (withdrawn)

* cited by examiner

METHOD BY WHICH CALL CENTERS CAN VECTOR INBOUND TTY CALLS AUTOMATICALLY TO TTY-ENABLED RESOURCES

FIELD

The invention relates generally to contact centers and particularly to identifying and appropriately routing TTY-enabled contacts.

BACKGROUND

To allow for people having speech and/or hearing disabilities that prevent them from using conventional telephones to communicate over the public switched telephony network, text telephones (TTY devices), also known as telecommunications devices for the deaf (TDD devices) have been developed. In general, such devices encode characters of text using sequences of audible tones. In particular, in response to receiving a command to transmit a character, a TTY device will generate a sequence of audible tones that is transmitted through the telephone network to a similar TTY device at the receiving end. The TTY device at the receiving end decodes the sequence of audible tones, and displays or otherwise outputs the encoded character.

Text telephone devices operate according to various operating protocols or standards. When a call is placed between countries or regions adhering to different protocols, standard TTY devices become inoperable. For example, in the United States, TTY devices communicate with one another using a 45.45 Baud frequency shift key protocol commonly referred to as Baudot signaling. Baudot signaling transmits characters using a sequence of seven audible tones at either 1400 Hz or 1800 Hz. In particular, a Baudot character comprises a start bit of 1800 Hz, five tones of either 1400 or 1800 Hz to signal the series of five bits specifying the character, and a stop bit of 1400 Hz. There is no error correction. There is no "handshake" tone, nor is there a carrier tone. (TTY devices that use this style of encoding are silent when not transmitting.) At 45.45 Baud, the duration of each individual tone signaling the start tone and the five tones specifying the character is 22 milliseconds. The stop tone is often 33 milliseconds in duration, and can be 44 milliseconds.

The standard for TTY devices that is commonly employed in the United Kingdom, Ireland, Australia, and South Africa is identical to the standard used in the United States, except that the system is 50 Baud. Accordingly, tones that in the U.S. TTY protocol are 22 ms in duration are 20 ms in duration according to the U.K. protocol. This difference is sufficient to prevent devices designed to operate using one of the protocols to interoperate with devices designed to operate using the other protocol.

For a variety of reasons, particularly problems caused by packet loss and audio compression, it is not practical to use voice or audio channels on packet-switched Voice over Internet Protocol or VoIP wide area networks to transmit TTY tones. For this reason, various non-audio data protocols, such as RFC2833 and RFC2793, are being used to convert the TTY tones into equivalent packet payloads for transmission over the Internet.

Because many TTY callers currently do not have the necessary software to make Internet calls, most TTY calls are still made over traditional circuit-switched networks, such as the Public Switched Telecommunications Network or PSTN. This includes traditional TTY calls that may be directed to a resource that is on an IP or VoIP network, thereby often necessitating a hybrid architecture in which a gateway device translates between audio TTY tones on the circuit-switched network and equivalent non-audio data packets on the packet-switched network.

Even though the problem of reliable transmission of TTY signals on VoIP networks has been addressed in the prior art, a problem that remains is that call centers, including 9-1-1 emergency services and 2-1-1/3-1-1 information services, presently lack an inexpensive mechanism for identifying incoming PSTN calls that are from TTY users (hereinafter referred to as TTY-enabled calls). As a result, the routing of those calls to an appropriate TTY-enabled resource has tended to be inefficient. There are a number of reasons for this deficiency. For example, unlike facsimile machines and computer modems which transmit CNG tones, TTY's do not emit a self-identifying handshake tone or a carrier tone. Even though some call center configurations prompt TTY callers to enter a specified DTMF touch tone command to identify themselves as TTY callers, many TTY's, including the Avaya™ Model 8840™, are unable to generate DTMF signals after the call is placed. (Such TTY's switch automatically to TTY mode after generating the necessary DTMF signals to dial the call.) As a result, many TTY callers are unable to make menu selections with traditional DTMF-input automated attendant and IVR systems.

Because many TTY users are unable to transmit DTMF signals, IVR systems that are able to accept TTY-format menu selections, such as the Avaya Interactive Response™ platform, have been developed. However, even with these systems, a complicating factor is that the Baudot communications protocol used by TTY's is moded, i.e., the same sequence of tones can actually correspond to different characters. (Illustratively, the five-bit sequence 00001 can correspond to the letter E or to the number 3, depending on whether the TTY is in letters mode or numbers mode. Because the protocol itself is half-duplex, the user of a TTY device who has tried to transmit the letter E has no way of knowing whether the receiving device decoded this transmission as an E or as a 3.) To overcome the complications of moded output and make menu selections possible, specialized software—unnecessary in DTMF-only systems—is often required to resolve the potential ambiguity of the input. Many call centers use such specialized software to provide automated attendant and IVR systems that can accept TTY-format inputs in place of DTMF input. However, in call centers in which the only application for the software would be to vector a TTY call to a TTY-equipped agent, the use of such TTY-decoding software represents a very expensive solution.

As a consequence, most call centers that desire to be directly accessible to TTY users provide a separate phone number for TTY callers. Unfortunately, provision of separate voice and TTY inbound telephone numbers represents an additional expense for these call centers, especially if both of the inbound lines are "toll free." Although this practice is currently used by many private call centers, it is now barred by the U.S. Department of Justice for 9-1-1 services, chiefly because, in a typical installation, it would not be possible to provide a separate easy-to-remember three-digit number for the TTY users. The configuration recommended by the U.S. Department of Justice for 9-1-1 call centers is to equip all agents with TTY devices, an approach that adds significantly to the equipment costs for 9-1-1 centers.

SUMMARY

These and other needs are addressed by the various embodiments and configurations of the present invention.

The present invention is directed generally to a method and apparatus that determines whether an incoming contact, which is commonly circuit-switched, is TTY-enabled. As used herein, "TTY-enabled" refers to a device configured to receive and/or transmit TTY signals. Examples of TTY-enabled devices include analog or digital telephones engaged with a TTY device, IVR's configured to send and/or receive TTY signals, messaging systems that are able to prompt in TTY format and accept TTY format messages, and the like.

In one embodiment, the present invention is directed to a contact processing method that includes the steps:

(a) receiving an incoming contact;

(b) transmitting one or more TTY characters to the contactor;

(c) determining whether a TTY response has been received from the contactor within a selected time;

(d) when a TTY response has been received within the selected time, routing the contact to a TTY-enabled contact center resource (e.g., a TTY-equipped agent and a TTY-compatible IVR system); and (e) when no TTY response has been received within the selected time, processing the contact as a non-TTY-enabled contact. Steps (b) and (c) are performed before the contact is routed to a contact center resource. A contact that is TTY-enabled can be identified regardless of the precise text content of the received TTY response. Put simply, the fact that a TTY response is received tells the contact center that the contact is TTY-enabled. Typically, the transmitted TTY character set includes a plurality of characters to avoid a TTY user from wrongly concluding, from a single TTY character, that talk off has occurred.

In one configuration, the transmitted TTY character(s) is the initial set of signals transmitted by the contact center to the contactor. This prevents the TTY contactor from erroneously concluding that he or she has dialed or otherwise been connected with the wrong number.

In one configuration, the operation of an encoder/decoder in the contact center is monitored to determine whether a set of received signals is from a TTY device. This may be effected by detecting the activation or deactivation of the encoder/decoder and/or analyzing the packet header and/or packet payload associated with the set of received signals.

In one configuration, the contact center determines a geographic proximity of the contactor based on the characteristics of the tones in the TTY response. As noted previously, TTY signals have differing requirements in differing countries.

The present invention can have a number of advantages over the prior art. For example, the present invention can be considerably more convenient because it permits TTY users to use the same phone number that everyone else uses for the same services (e.g., 2-1-1). The present invention generally does not require TTY users to generate DTMF signals to be vectored properly. The present invention can be considerably less expensive than other approaches, particularly the approach of equipping every agent with a TTY device and training them to interact with TTY users, and implemented with little effort on platforms that already support TTY-on-VoIP. Current media servers currently look on analog and digital ports for acoustic tones and encode the signals in data packets according to an existing protocol, such as RFC2793 or RFC2833. A sniffer or similar device can simply monitor these operations to identify TTY-enabled contacts. The introductory TTY signal transmitted to each contactor to determine whether the contactor is TTY-enabled can be configured to be unobtrusive to non-TTY-enabled contactors.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
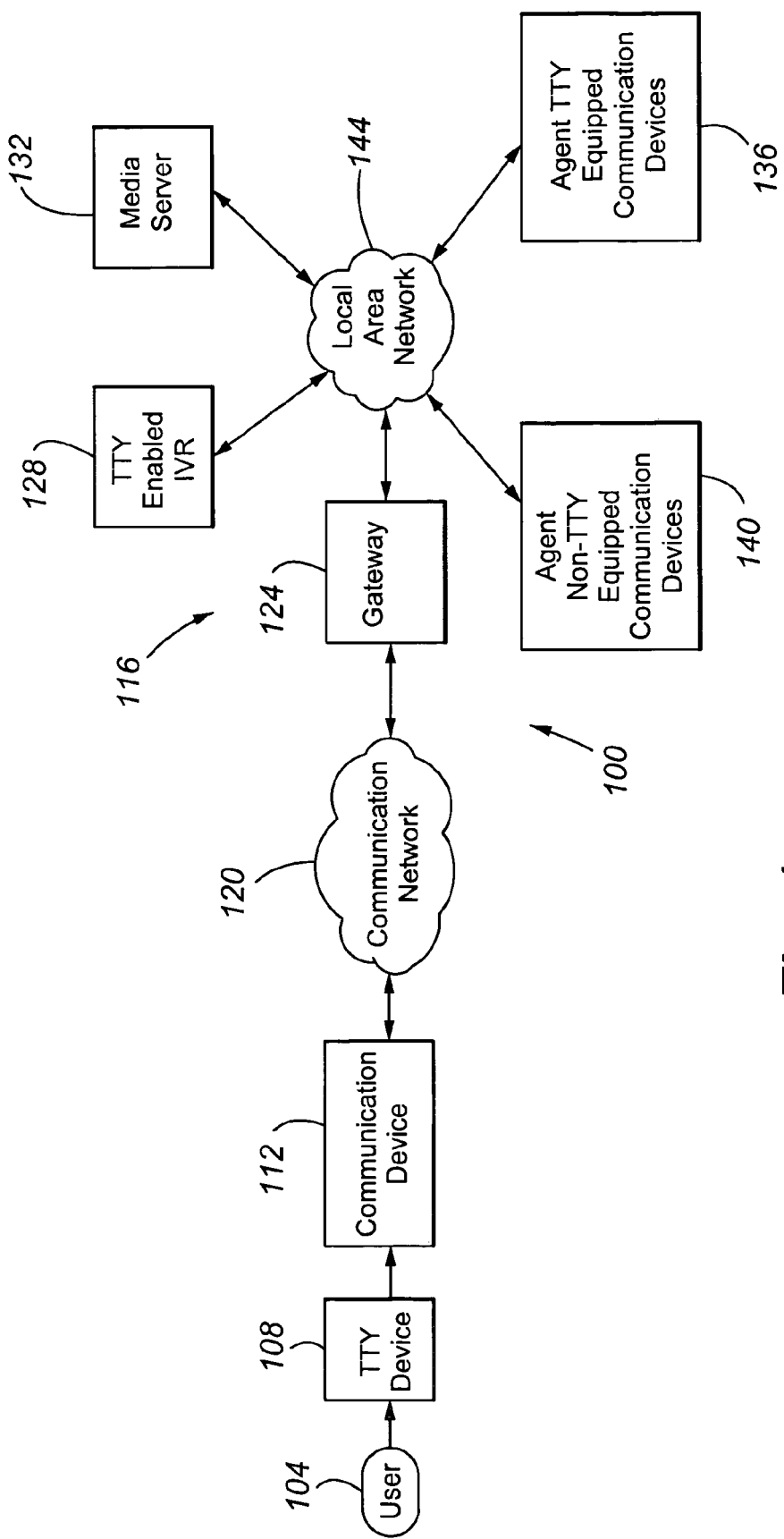
FIG. 1 is a block diagram of a communication system according to an embodiment of the present invention.

With reference now to FIG. 1, a communication system 100 in accordance with an embodiment of the present invention is depicted. The communication system 100 generally includes a user 104 associated with a teletype (TTY) device 108 and a communication device 112, a contact center 116, and an intervening communications network 120.

The communication device 112 may be interconnected to the communication network 120 directly as shown, or through a media server (not shown). The TTY device 108 is conventional. As can be appreciated by one of skill in the art, the TTY device 108 typically includes a keyboard for entering selected characters for transmission and a display for displaying received characters. Likewise, the communication device 112 is conventional, such as a standard analog or digital telephone. As can be appreciated by one of skill in the art, the TTY device 108 and communication device 112 may also be integral to one another, rather than being implemented as separate components. In addition, a TTY device 108 may comprise an interactive voice response system.

The communication network 120 may be circuit-switched and/or packet-switched, with a circuit-switched network, such as the Public Switched Telecommunications Network, being typical.

The contact center 116 includes a gateway 124 to act as a signal repeater and protocol converter, a TTY-enabled Interactive Voice Response or IVR 128 to provide automated contact servicing, a media server 132 to effect vectoring or routing of incoming contacts, agent TTY equipped communication devices 136 to permit agents to service with the TTY-type or TTY-enabled contacts, and agent non-TTY equipped communication devices 140 to permit agents to service regular (non-TTY-type) contacts, all interconnected by a packet-switched Local Area Network or LAN 144. The TTY-enabled IVR 128 and agent TTY-equipped and agent non-TTY equipped communication devices 136 and 140, respectively, are conventional. In particular, the agent TTY-equipped communication devices 136 can be equipped similarly to the TTY device 108 and associated communication device 112.

Figure 2:
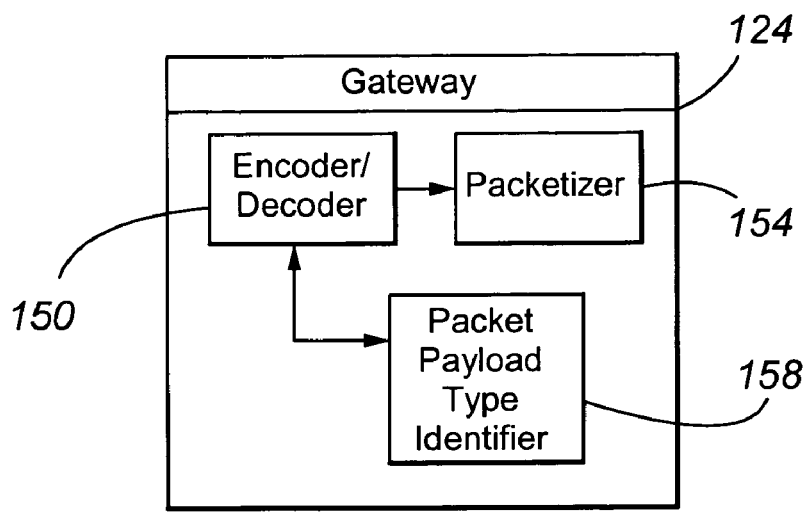
FIG. 2 is a block diagram depicting a gateway according to an embodiment of the present invention.

The gateway 124 is depicted in FIG. 2. The gateway 124 includes an encoder/decoder 150 to receive circuit-switched TTY tones and convert them into corresponding digital representations, a packetizer 154 to packetize the digital representations into a collection of packets for transmission over the LAN 144, and a packet payload type identifier 158 to monitor the operational state of the encoder/decoder (e.g., whether the encoder/decoder 150 is active or inactive) and/or encoder/decoder and/or packetizer output and determine whether the incoming contact is TTY-enabled. As will be appreciated, the output of the encoder/decoder and certain packet header information is determined by the particular TTY protocol employed. Under protocols such as T.140 and RFC2793, a text equivalent of the received set of TTY tones is generated and packetized. With the RFC2833-based approach that has been implemented by Avaya, descriptions of the received TTY tones are generated and packetized. The encoder/decoder 150 and packetizer 154 are conventional.

The media server 132 interconnects analog, IP telephone, and/or digital communications devices to the wider communication network 120. The media server 132 can be any converged architecture for directing circuit-switched and/or packet-switched customer contacts to one or more communication devices. Typically, the server is a stored-program-controlled system that conventionally includes interfaces to external communication links, a communications switching fabric, service circuits (e.g., tone detectors and generators, etc.), memory for storing control programs and data, and a processor (i.e., a computer) for executing the stored control programs to control the interfaces and the fabric and to provide automatic contact-distribution functionality. Features provided by the media server typically include not only telephony features and intelligent contact routing but also localization, collaboration, mobility, messaging, system management, attendant features, networking, and application programming interfaces. Illustratively, the media server 132 is a modified form of Avaya Inc.'s Definity™ Private-Branch Exchange (PBX)-based ACD system; Avaya Inc.'s IP600™ LAN-based ACD system, or an S8100™, S8300, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Figure 3:
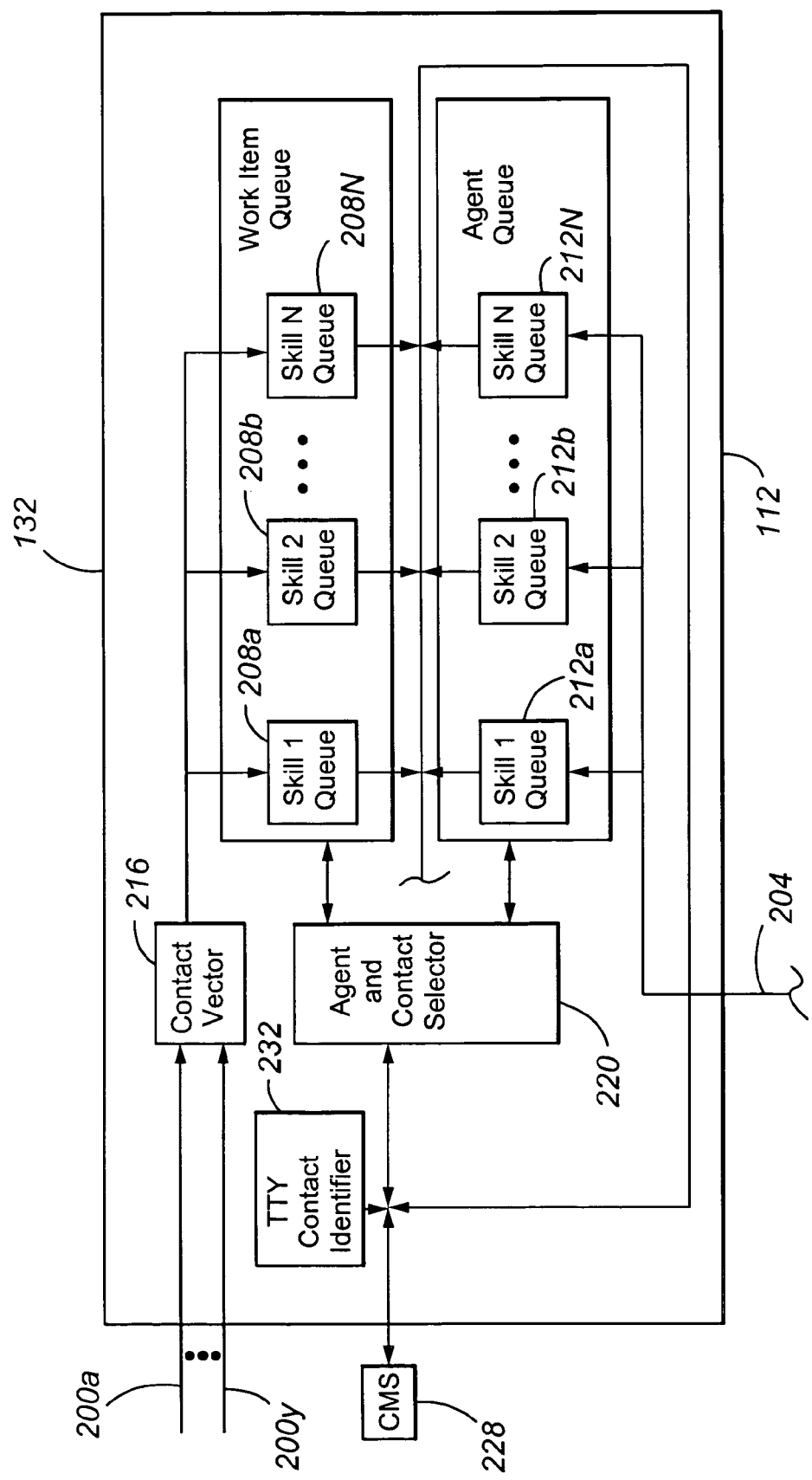
FIG. 3 is a block diagram depicting a media server according to an embodiment of the present invention.

One possible configuration of the media server 132 is depicted in FIG. 3. The server 132 is in communication with a plurality of customer communication lines 200a-y (which are typically part of the network 120 and/or can be one or more packet-switched links) and agent communication line 204 (which can be a voice-and-data transmission line such as LAN 144 and/or a circuit switched voice line). The server 132 can include Avaya Inc.'s Operational Analyst™ or OA with On-Line Analytical Processing or OLAP technology, Basic Call Management System™ or BCMS, or another type of Call Management System or CMS that gathers contact records and contact-center statistics for use in generating contact-center reports. OA, BCMS, and CMS will hereinafter be referred to individually or collectively as CMS 228.

Included among the data stored in the server 132 is a set of logical work item queues 208a-n, a separate set of physical agent queues 212a-n, an agent and contact selector 220, a contact vector 216, and a TTY contact identifier 232. As will be appreciated, the agent or contact selector 220 assigns incoming contacts or work items to a corresponding work item queue based upon contact characteristics and agents to one or more corresponding agent queues 212a-n based upon the skills that they possess. For example, TTY-enabled contacts are assigned to a work item queue that is served by an agent queue comprising TTY-trained and equipped agents.

Each logical work item queue 208a-n corresponds to a different set of agent skills, as does each agent queue 212a-n. Conventionally, work items are prioritized and either are enqueued in individual ones of the logical work item queues 208a-n in their order of priority or are enqueued in different ones of a plurality of logical work item queues that correspond to a different priority.

The work item or contact vector 216 assigns work items to different work item queues 208a-n based upon a number of predetermined criteria, including customer identity, customer needs (such as TTY interaction), contact center needs, current work item center queue lengths, customer value, and the agent skill that is required for the proper handling of the contact.

Call vectoring, one type of work item routing which may be used by the contact vector 216, is a process of defining vector programs that determine how a specific call should be routed and what call treatment that call is to be given. Call vectoring includes three basic components, namely Vector Directory Numbers (VDNs), vectors, and vector commands. When a contact arrives, the contact is first directed to a VDN. A VDN is an internal telephone number that, in turn, directs the call to the specific vector. The vector is a set of commands that define the processing of a contact. The VDN represents the call type or category (or the service desired by the contactor), such as billing, customer service, sales, and the like. In the present invention, a number of parameters determine an appropriate VDN to which a contact is directed, including Directory Number Information Service or DNIS digits, ANI/II digits, and/or whether the contact is TTY enabled.

When each and every contact arrives at the gateway 124 (regardless of whether or not the contact is TTY enabled), the TTY contact identifier 232 (while the contact is held or located at the gateway 124) effects transmission of one or more TTY characters to the contactor seeking to elicit a TTY response. The TTY transmission is typically the first or initial set of signals provided to the contactor, e.g., provided before any audio response, such as music on hold or automated greeting, is provided to the contactor. This prevents the TTY user 104 from hanging up in the mistaken belief that he or she has dialed the wrong number and provides more time in which to receive and process a TTY response. As will be appreciated, TTY devices 108 provide feedback to the TTY user 104 as to the type of signals being received (e.g., TTY tone, ring, voice, etc.). The TTY characters transmitted can convey any desired message so long as the message will have a high likelihood of persuading the contactor to provide a TTY response if the contact is TTY-enabled. For example, the message can be "TTY?", "Hello", "Hi", "GA" (a standard TTY abbreviation for "Go Ahead"), and the like. Preferably, the number of TTY tones transmitted is not enough to dissuade or otherwise annoy non-TTY enabled contactors. Keeping in mind that a six-character TTY transmission will be approximately one second long, the short TTY transmissions described previously will sound to a non-TTY caller like a parakeet chirp or an additional ring, and will not lead the voice-based contactor to believe that the contact has been lost, has a poor connection, or has been misdirected to a facsimile machine. When a TTY response is received from the caller (regardless of what the TTY message conveys), the packet payload type identifier 158 monitors the encoder/decoder 150 and notifies the TTY contact identifier 232 that the inbound contact is TTY-enabled, and the TTY contact identifier 232 requests that the agent and contact selector 220 vector the contact to a work item queue 208 serviced by an agent queue 212 containing TTY trained agents using agent TTY-equipped communication devices 136.

The operation of the packet payload type identifier 158 and TTY contact identifier 232 will now be described with reference to FIGS. 4 and 5.

Figure 5:
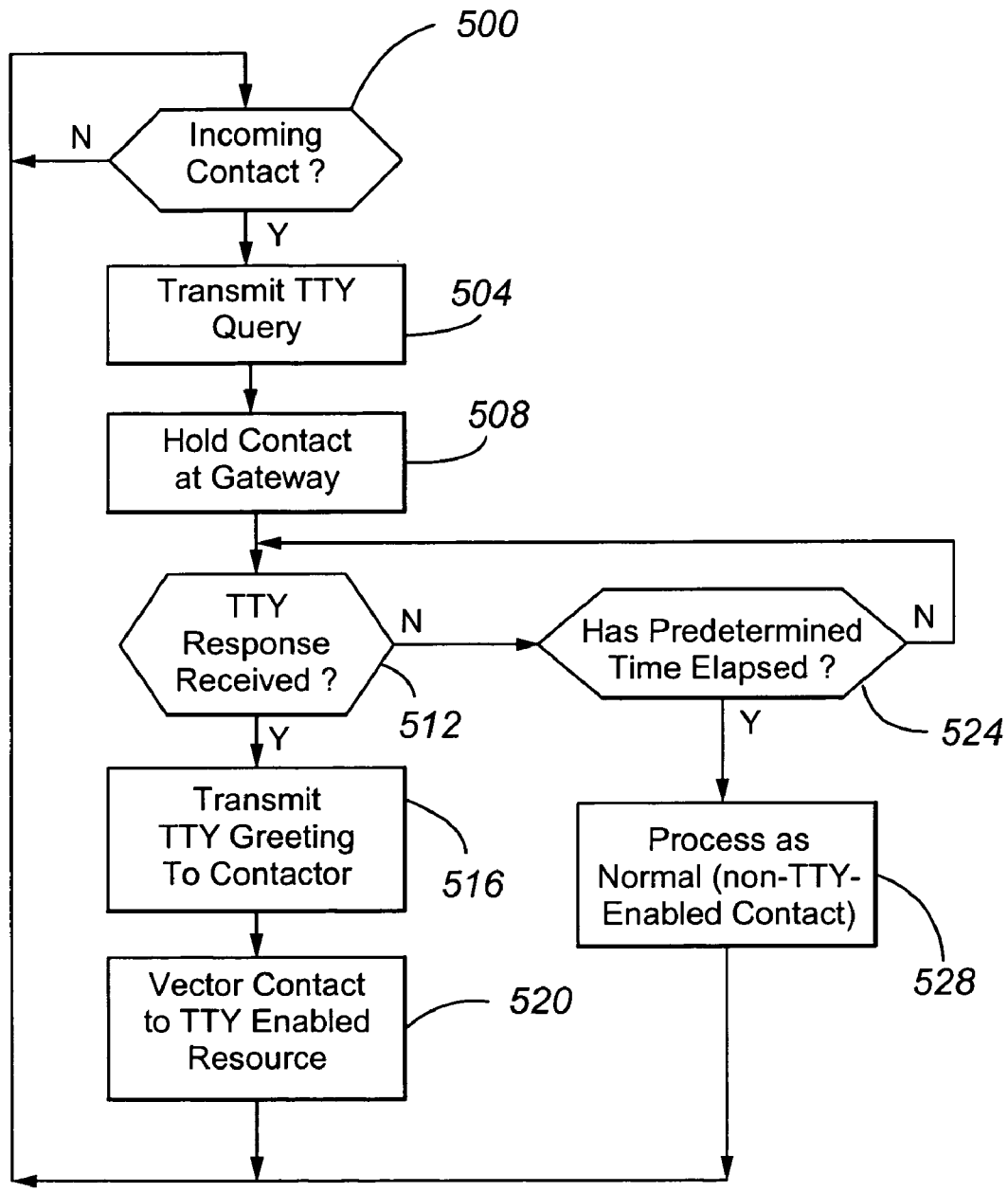
FIG. 5 is a flowchart depicting the operation of a TTY contact identifier in the media server according to an embodiment of the present invention.

With reference to FIG. 5, an incoming contact is received by the gateway 124 and a notification is forwarded to the media server 132. In decision diamond 500, the media server 132 determines that the incoming contact has arrived and is waiting for routing.

In step 504, the media server 132 instructs the gateway 124 to generate the TTY tones associated with a predetermined set of TTY characters and forward the generated TTY tones to the user 104. At this juncture, the TTY contact identifier 232 has not determined whether or not the user is TTY-enabled because the signaling from the communication device 112 has been by DTMF and not TTY tones. To avoid distracting non-TTY-enabled contactors, the number of TTY characters in the set is typically fewer than five characters (i.e., a sequences of tones lasting for 825 milliseconds or less).

In step 508, the incoming contact is held or parked at the gateway 124 (or maintained in a hunt group) until a TTY response is received from the user or the passage of a predetermined time, whichever occurs first. While the media server 132 is awaiting a TTY response, a prerecorded greeting or music may be played to prevent non-TTY-enabled callers from hanging up.

In decision diamond 512, the identifier 232 determines whether a TTY response has been received. If not, the identifier 232 in decision diamond 524 determines whether or not a predetermined time has elapsed since the TTY character set was transmitted. If not, the identifier returns to and repeats decision diamond 512. If so, the media server 132, in step 528, processes the contact as a normal (non-TTY-enabled) contact and routes the contact to a queue or immediately to an agent non-TTY-equipped communication device 140 for servicing.

Figure 4:
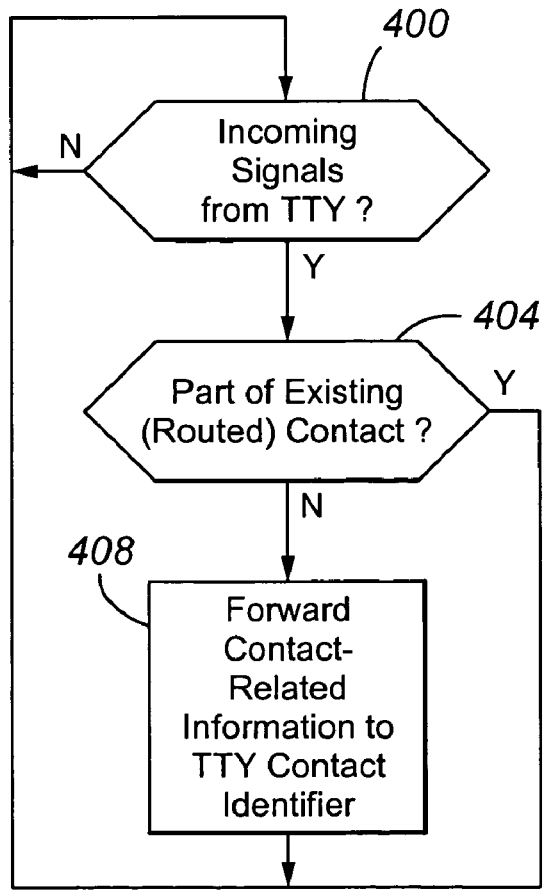
FIG. 4 is a flowchart depicting the operation of a packet payload type identifier in the gateway according to an embodiment of the present invention.

Turning now to FIG. 4, the operation of the packet payload type identifier 158 will be discussed.

In decision diamond 400, the packet payload type identifier 158 determines whether or not an incoming contact is from a TTY. This is done by monitoring, for each incoming set of signals, the operation of the encoder/decoder 150. As will be appreciated, the encoder/decoder 150 generates audio and non-audio packets as it decodes and then re-encodes the audio signals that it receives from the communications network 120. In one configuration, the packet payload type identifier 158 can assume that TTY signals have been received when the encoder/decoder 150 becomes active. As will be appreciated, the encoder/decoder 150 is present specifically to transmit TTY tones via non-voice or non-audio channels. In another configuration, the packet payload type identifier 158 alternatively or additionally evaluates the non-audio output of the encoder/decoder 150 and/or packetizer 154 to determine whether or not the received signals are from a TTY. As noted, when circuit-switched TTY signals are received they may be converted by the encoder/decoder 150 into a description of the individual tones and/or into text equivalent to the characters represented by the TTY tones. The type identifier 158 looks for the type of data packets that would be expected to occur when the incoming audio signal includes TTY tones. For example, where RFC2833 is the protocol applied by the encoder/decoder 150 the type identifier 158 looks for RFC2833 packets that describe acoustic tones of 22 ms duration at either 1400 or 1800 Hz (U.S. standard). Where RFC2793 is the protocol applied by the encoder/decoder 150, the type identifier 158 looks for RFC2793 packets that comprise text equivalents to TTY tones. For additional accuracy, the identifier 158 may wait until a plurality of packets representing a plurality of TTY tones has been generated before concluding that the contact is TTY-enabled. In yet another configuration, the packet payload type identifier examines the header of the packet to identify protocol descriptors indicating that the payload is to processed in accordance with a TTY protocol, such as RFC2793 or RFC2833. In yet another configuration, the encoder/decoder is configured to notify the packet payload type identifier and/or TTY contact identifier directly when a set of TTY tones is received.

When the incoming set of signals is not from a TTY, the type identifier 158 does nothing and returns to and repeats decision diamond 400 when a next set of signals is received.

When the incoming set of signals is from a TTY, the type identifier 158, in decision diamond 404 determines whether the signals are part of an existing (or already routed) contact. If so, the type identifier does nothing and returns to and repeats decision diamond 400 when a next set of signals is received. If not, the type identifier proceeds to step 408. In an alternative configuration, the type identifier 158 notifies the contact identifier 232 as each and every set of TTY signals is received. The contact identifier 232 then determines, for each set of TTY signals, whether or not the set of TTY signals is part of an existing (already routed) contact.

In step 408, the type identifier 158 forwards the contact-related information to the TTY contact identifier 232 and thereafter returns to and repeats decision diamond 400 when a next set of signals is received. The contact-related information can include a unique contact identifier (e.g., electronic address (or telephone number) of the communication device, a timestamp associated with the contact, an identifier assigned by the media server 132, an identifier of a contact center destination to which the contact has already been routed, and the like) and a TTY notification flag that is set (or unset) when a set of TTY signals is received by the gateway 124.

Returning again to FIG. 5, the contact identifier 232, when a TTY response is received, transmits a normal TTY greeting or other instructional set of characters to the user 104. The instructional set of characters can include, for example, "SK" for "Stop Keying."

In step 520, the contact identifier 232 notifies the agent and contact selector 220 that the incoming contact is TTY-enabled. Based on this notification and other traditional routing parameters, the selector 220 routes the incoming contact to a queue 208 and/or an agent TTY equipped communication device 136.

A number of variations and modifications of the invention can be used. It would be possible to provide for some features of the invention without providing others.

For example in one alternative embodiment, the TTY contact identifier 232 and/or packet payload type identifier 158 is implemented as software, hardware (a logic circuit such as an Application Specific Integrated Circuit or ASIC), or a combination thereof.

In another alternative embodiment, the packet payload type identifier can determine the country/region of origin of the TTY caller based on the tone parameters or characteristics. For example, when the received TTY tones have a specified duration of 22 ms the TTY tones are indicative of a U.S.-format TTY while tone durations of 20 ms are indicative of a UK-format TTY. The country/region of the TTY caller may be taken into account during call vectoring. In this configuration, multiple sets of TTY tones of differing durations may be transmitted at different times by the gateway 124 before the contact is routed to determine which set of TTY tones to which the user 104 responds. This information would then be provided to the media server 132 as additional routing information.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A contact processing method, comprising:
   (a) receiving at a contact server, an incoming contact from a communication device of a contactor;
   (b) in response to step (a), transmitting, by a gateway, at least one TTY character to the contactor's communication device;
   (c) determining, by the server whether a TTY response from the contactor's communication device is received by the gateway within a selected time, wherein steps (b) and (c) are performed before the contact is routed to a contact center resource; and
   (d) applying, by the server, the following rules:
      (D1) when a TTY response is received within the selected time, routing, by the server, the contact to a TTY-enabled contact center resource; and
      (D2) when no TTY response is received within the selected time, processing, by the server, the contact as a non-TTY-enabled contact and routing the contact to the contact center resource.

2. The method of claim 1, wherein step (b) is performed prior to transmission of an audio signal to the contactor and wherein rule (D1) is performed.

3. The method of claim 2, wherein the transmitted at least one TTY character is the initial set of signals transmitted by a contact center to the contactor and wherein the server determines that a TTY response is received within the selected time and the contact is routed to the TTY-enabled contact center resources.

4. The method of claim 1, wherein the determining step comprises:
   monitoring operation of an encoder/decoder in the contact center to determine whether a set of received signals is from a TTY device.

5. The method of claim 4, wherein the encoder/decoder receives TTY tones and converts the received TTY tones into packets for transmission over a packet switched network in the contact center and wherein the monitoring step comprises:
   analyzing at least one of a packet header and packet payload associated with the set of received signals to determine whether the set of received signals is from a TTY device.

6. The method of claim 1, wherein the at least one TTY character comprises at least two but no more than five TTY characters and wherein the determining step comprises:
   determining a geographic region of the contactor based on the characteristics of the tones in the TTY response.

7. A computer readable medium comprising computer readable and executable instructions that, when executed, perform the steps of claim 1.

8. A contact processing system comprising:
   gateway means for receiving an incoming contact from a contactor communication device and transmitting at least one TTY character to the contactor's communication device; and
   contact center means for (i) determining whether a TTY response from the contactor's communication device is received by the gateway means within a selected time, wherein function (i) is performed before the contact is routed to a contact center resources; (ii) when a TTY response is received within a selected time, routing the contact to a TTY-enabled contact center resource; and (iii) when no TTY response is received within the selected time, processing the contact as a non-TTY-enabled contact.

9. The system of claim 8, wherein function (i) is performed to transmission of an audio signal to the contactor, wherein the TTY response is received within the selected time and the contact is routed to a TTY-enabled contact center resource, and wherein the transmitted at least one TTY character is the initial set of signals transmitted by the contact center to the contactor.

10. The system of claim 8, wherein the determining function comprises:
   monitoring an operation of an encoder/decoder in the contact center to determine whether a set of received signals is from a TTY device, wherein the encoder/decoder receives TTY tones and converts the received TTY tones into packets for transmission over a packet switched network in the contact center and wherein the monitoring function comprises:
   analyzing at least one of a packet header and packet payload associated with the set of received signals to determine whether the set of received signals is from a TTY device.

11. A contact processing system, comprising:
   a contact center gateway operable to receive an incoming contact from a communication device of a contactor and transmit at least one TTY character to the contactor's communication device; and a TTY contact identifier operable to (i) determine whether a TTY response from the contactor's communication device is received by the gateway within a selected time, wherein operation (i) is performed before the contact is routed to a contact center resource; (ii) when a TTY response is received within the selected time, route the contact to a TTY-enabled contact center resource; and (iii) when no TTY response is received within the selected time, process the contact as a non-TTY-enabled contact.

12. The system of claim 11, wherein operation (i) is performed prior to transmission of an audio signal to the contactor and wherein a TTY response is received within the selected time and the contact is routed to a TTY-enabled contact center resource.

13. The system of claim 12, wherein the transmitted at least one TTY character is the initial set of signals transmitted by the contact center to the contactor and wherein a TTY response is received within the selected time and the contact is routed to a TTY-enabled contact center resource.

14. The system of claim 11, wherein the determining operation comprises:

monitoring operation of an encoder/decoder in the contact center to determine whether a set of received signals is from a TTY device.

15. The system of claim 14, wherein the encoder/decoder receives TTY tones and converts the received TTY tones into packets for transmission over a packet switched network in the contact center and wherein the monitoring operation comprises:

analyzing at least one of a packet header and packet payload associated with the set of received signals to determine whether the set of received signals is from a TTY device.

16. The system of claim 11, wherein the at least one TTY character comprises at least two but no more than about five TTY characters and wherein the determining operation comprises:

determining a geographic region of the contactor based on the characteristics of the tones in the TTY response.

17. The method of claim 5, wherein the at least one of a packet header and packet payload is packet type, wherein packet payload type is associated with non-audio output of the encoder/decoder, and wherein packet payload type is analyzed by examining the packet payload for compliance with a selected TTY protocol.

18. The method of claim 5, wherein the at least one of a packet header and packet payload is packet header, wherein the packet header is analyzed for a protocol identifier associated with a TTY protocol.

19. The method of claim 5, further comprising:

when a TTY response is received, determining whether the TTY response is part of an existing contact previously routed to a TTY-equipped agent; and when the TTY response is not part of an existing, previously routed contact, forwarding the contact to a TTY-equipped agent.

20. The method of claim 1, wherein the at least one TTY character comprises multiple sets of TTY tones of differing durations.

* * * * *